(12) United States Patent
Cascioli (10) Patent No.: US 11,663,382 B1
(45) Date of Patent: May 30, 2023

(54) SYSTEMS AND METHODS FOR HARDWARE TROJAN DETECTION AND MITIGATION

(71) Applicant: ARCHITECTURE TECHNOLOGY CORPORATION, Eden Prairie, MN (US)

(72) Inventor: Joseph Cascioli, Ithaca, NY (US)

(73) Assignee: ARCHITECTURE TECHNOLOGY CORPORATION, Eden Prairie, MN (US)

(*) Notice: Subject to any disclaimer, the term of this patent is extended or adjusted under 35 U.S.C. 154(b) by 282 days.

(21) Appl. No.: 16/140,320

(22) Filed: Sep. 24, 2018

(51) Int. Cl.
| | |
|---|---|
| G06F 21/57 | (2013.01) |
| G06F 16/58 | (2019.01) |
| G06F 30/33 | (2020.01) |
| G06F 21/76 | (2013.01) |
| G06F 30/39 | (2020.01) |
| G06F 30/333 | (2020.01) |
| G06F 115/06 | (2020.01) |
| G06F 119/18 | (2020.01) |

(52) U.S. Cl.
CPC .......... G06F 30/33 (2020.01); G06F 21/577 (2013.01); G06F 21/76 (2013.01); G06F 30/39 (2020.01); G06F 30/333 (2020.01); G06F 2115/06 (2020.01); G06F 2119/18 (2020.01)

(58) Field of Classification Search
CPC ........ G06F 30/33; G06F 30/39; G06F 30/333; G06F 21/76; G06F 21/577; G06F 21/57
USPC .......................................................... 703/15
See application file for complete search history.

(56) References Cited

U.S. PATENT DOCUMENTS

| | | | | |
|---|---|---|---|---|
| 8,839,426 | B1* | 9/2014 | Brueckner | G06F 21/606 726/22 |
| 9,081,911 | B2* | 7/2015 | Powers | G06F 13/4252 |
| 9,769,250 | B2* | 9/2017 | Powers | G06F 11/1474 |
| 9,838,415 | B2* | 12/2017 | Powers | G06F 9/45558 |
| 9,887,974 | B2* | 2/2018 | Charan | H04L 63/0471 |
| 10,572,671 | B2* | 2/2020 | Liu | G06F 12/1081 |
| 10,999,262 | B1* | 5/2021 | Ramanujan | H04L 63/0485 |
| 2011/0055649 | A1* | 3/2011 | Koushanfar | G06F 21/577 714/729 |

(Continued)

OTHER PUBLICATIONS

Author: Joseph Cascioli, Title: ARSA—ASIC Redesign for Security and Analysis, Topic Number and Name: SB173-004—Design Tools for Hardware Trojan Detection and Mitigation, Architecture Technology Corporation, submitted as a proposal on Oct. 25, 2017, 24 pages.

*Primary Examiner* — Ashish Thomas
*Assistant Examiner* — Nargis Sultana
(74) *Attorney, Agent, or Firm* — Foley & Lardner LLP (57) ABSTRACT

Disclosed herein is application specific integrated circuit (ASIC) redesign for security and analysis testing tool, which includes hardware description language code with on-chip security circuitry for detecting and mitigating hardware Trojan horses (HTHs) in an ASIC chip. The testing tool is used between a design stage of the ASIC chip and a synthesis phase of production of the ASIC chip to add test circuitry to the ASIC chip in order to facilitate testing and protecting of the ASIC chip from the HTHs long after production. The test circuitry facilitates search for HTHs, HTH triggering events, and changes made to the ASIC if the HTH has been activated.

20 Claims, 4 Drawing Sheets

(56) References Cited

U.S. PATENT DOCUMENTS

| | | | |
|---|---|---|---|
| 2011/0055851 A1* | 3/2011 | Potkonjak | H04L 9/0866 |
| | | | 719/318 |
| 2013/0019324 A1* | 1/2013 | Tehranipoor | G09C 1/00 |
| | | | 726/34 |
| 2013/0174256 A1* | 7/2013 | Powers | H04L 63/145 |
| | | | 726/23 |
| 2017/0205463 A1* | 7/2017 | Nakamura | G01R 31/318547 |
| 2017/0228562 A1* | 8/2017 | Guilley | H04L 9/002 |
| 2017/0310688 A1* | 10/2017 | Lecomte | H04L 9/3278 |
| 2018/0107765 A1* | 4/2018 | Darbari | G06F 11/0754 |
| 2018/0285483 A1* | 10/2018 | Guilley | G06F 30/3323 |
| 2019/0005173 A1* | 1/2019 | Blair | G06F 21/87 |
| 2019/0377868 A1* | 12/2019 | Schat | G01R 31/318588 |
| 2020/0018792 A1* | 1/2020 | Webster | G06F 21/78 |

* cited by examiner

SYSTEMS AND METHODS FOR HARDWARE TROJAN DETECTION AND MITIGATION

TECHNICAL FIELD

This application relates generally to field of integrated circuit testing systems, and more specifically to methods and processes for detecting and mitigating hardware Trojans in integrated circuits.

BACKGROUND

Integrated circuit (IC) fabrication is increasingly becoming a globalized, high-volume, and a highly competitive enterprise, with leading-edge wafer foundries located around the world. However, several entities, especially dealing with sensitive information, have historically required domestic, low-volume, and trusted fabrication sources in order to safeguard classified intellectual property contained in circuit designs. As IC fabrication becomes more globalized, new technologies are required to retain access to most advanced fabrication nodes for high-performance hardware needs, such as, hardware security techniques intended to prevent reverse engineering and subsequent modification of sensitive intellectual property of these circuits by unauthorized third parties.

In particular, application specific ICs (ASICs) fabricated in foreign, untrusted foundries are more vulnerable to risk threats because designs of these ASICs are available through imaging and side-channel analysis as well as invasive analysis, such as delayering and cross section analysis. In some cases, an adversary may extract a design of an ASIC to maliciously attack a circuit. The adversary may be an insider who may steal the design of the ASIC from a computer system. When the adversary extracts a design of an ASIC, the adversary may resynthesize a netlist corresponding to the ASICs and its layout to include malicious modifications; referred to as hardware Trojan horses (HTHs). A HTH can cause serious security risks when inserted undetected into the ASICs as the HTH may modify the ASIC's functionality, leak sensitive information, and/or degrade performance of the ASIC. The security risks associated with the HTH may further include data exfiltration from the ASIC, destruction of the ASIC, or loss of valuable resources, which can all lead to loss of data, money, operational capacity, operational security, and trade secrets of the entity using the ASIC.

In recent years, while increase of size and complexity of ASICs has amplified capabilities and efficiency of the ASICs, the bigger size and complexity of the ASICs unfortunately also help facilitate insertion of HTH in the ASICs. Furthermore, HTH along with an uncontrolled multiphase manufacturing process typically leaves the ASIC development at a constant risk. The security risks associated with the ASIC impacts all entities that use ASIC chips, ranging from automobiles to aeronautics. In some cases, the security risks associated with the ASIC to government agencies may be higher than commercial enterprises as the security risks associated with the ASIC could lead to a loss of mission-critical data, government secrets, or even a loss of life during security related operations. For instance, for the government agencies, machine running encryption or high-power computations corresponding to the ASIC could be destroyed, or even worse have the encryption algorithm corresponding to the ASIC broken by the HTH.

Throughout a production process, a design of the ASIC chip may pass through many foreign entities, especially given that a large amount of chip manufacturing happens outside the United States. Such a situation may create an increased risk for malicious HTH insertion by a third party source into the ASIC. Accordingly, a long supply chain production process passing through many entities creates many points of access for malicious codes, and once the malicious code such as the HTH has been inserted into the ASIC, it is very difficult to detect the HTH using conventional methods. One of the main reasons the HTHs are so difficult to identify in the ASIC is their ever-changing layout. For instance, when the HTHs are created, the HTH is typically fused with the ASIC design by merging their states in a finite-state machine representation of the ASIC chip, which makes tracking of HTH signatures very difficult. Furthermore, there are also a multitude of triggers events on the ASIC chip that activate a HTH payload, which have become increasingly difficult to test for and detect within the ASIC chip. For example, the trigger events such as a heat output, a time counter, or very low probabilistic inputs can make the HTHs nearly undetectable within the ASIC chip until the trigger events are triggered causing irreparable damage to the ASIC chip and associated equipment. Accordingly, due to the difficulty associated with detection of the HTHs within the ASIC chip, the HTHs make for discreet and capable tools for malicious actors.

Each currently available conventional off-chip ASIC test process is also costly and ineffective in finding HTHs within ASIC chip because an ASIC chip can be extremely large, making testing every section of the ASIC chip impractical. For instance, the ASIC chips coming back from production requires destructive testing until a verified ASIC chip is found, and then tests are run on the verified ASIC chip where the ASIC chip under authentication. For large ASIC chips, the running of the conventional off-chip ASIC test process becomes a costly process. Another popular testing technique is side channel analysis, which enables reading of side-channel parameters from outside the ASIC chip, such as heat output and power usage, to determine if a hardware Trojan has been activated within the ASIC chip. The side channel analysis testing technique is only effective on larger Trojans, as smaller Trojans do not make a measurable difference to side-channel parameters and therefore remain unnoticed. Furthermore, the side channel analysis testing technique requires a lab environment, and cannot be done in a field, and thereby making it a limited option when it comes to HTH detection within the ASIC chip.

SUMMARY

What is therefore desired is Application specific integrated circuit (ASIC) redesign for security and analysis (ASRA) testing tool, which comprises hardware description language code with on-chip security circuitry for detecting and mitigating Hardware Trojan Horses (HTHs) in an ASIC chip. The ARSA testing tool may be used between a design stage of the ASIC chip and a synthesis phase of production of the ASIC chip to add test circuitry to the ASIC chip in order to facilitate testing and protecting of the ASIC chip from the HTHs long after production. The added test circuitry may facilitate searching for HTHs, HTH triggering events, and changes made to the ASIC if the HTH has been activated. The ARSA software testing tool may further enable added security measures to different modules of the ASIC chip, and control interfaces between the different modules. Such features, combined with a database that keeps a track of different security solutions and their impact on performance of the ASIC chip, will provide ASIC developers testing tools required to improve on-chip security and testing while keeping power requirements and costs associated with the ASIC down.

In one embodiment, a method may include identifying, by a computer, one or more untrusted modules within a design of an integrated circuit (IC). The method may further include generating, by the computer, a design of a first testing circuit associated with the untrusted modules. The method may further include integrating, by the computer, the design of the IC with the design of the testing circuit to generate a design-for-test (DFT). The method may further include simulating, by the computer, the DFT to test the validity of operation of the first testing circuit. The method may further include, in response to the computer determining that the operation of the testing circuit is invalid, generating, by the computer, a design of a second testing circuit associated with the untrusted modules. The method may further include, in response to the computer determining that the operation of the first testing circuit is valid, indicating, by the computer, that the DFT is finalized for fabrication.

In another embodiment, a system may include an integrated circuit (IC), a non-transitory storage medium hosting a repository storing a design of the IC, and a processor coupled to the non-transitory storage medium. The processor is configured to identify one or more untrusted modules within the design of the IC. The processor is further configured to generate a design of a first testing circuit associated with the untrusted modules. The processor is further configured to integrate the design of the IC with the design of the testing circuit to generate a design-for-test (DFT). The processor is further configured to simulate the DFT to test the validity of operation of the first testing circuit. The processor is further configured to, in response to the processor determining that the operation of the testing circuit is invalid; generate a design of a second testing circuit associated with the untrusted modules. The processor is further configured to, in response to the processor determining that the operation of the first testing circuit is valid; indicate that the DFT is finalized for fabrication.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

An ARSA testing tool disclosed herein executes design-for-test (DFT) codes by inserting a circuitry into an ASIC chip, which will allow for testing and analysis of the ASIC chip by transmitting correct signals to the ASIC chip, and activating tests associated with the ASIC chip. The ARSA testing tool may further make available and execute mitigation techniques for defending against a triggered Hardware Trojan Horses (HTHs) or to prevent the HTHs from ever triggering. The ARSA testing tool may further keep a track of security measures, their costs, effectiveness, and design requirements of the ASIC chip. The ARSA testing tool may further provide a full suite of protection of the ASIC chip while utilizing analytics to help guide an ASIC developer in a most secure and efficient way possible. The ARSA testing tool may be developed as part of a set of software tools and security techniques that are compatible with standard electronic design automation (EDA) tools and design flow. The ARSA testing tool may have applications in many industrial fields including, but not limited to, global positioning systems (GPS), radar and communications transceivers, audio/video processors, and microelectronics. In some embodiments, the HTH may correspond to a minor or a major change to the ASIC chip that can disturb overall ASIC chip operation. With a precise design of the HTH, an attacker may alter the ASIC chip so that the ASIC chip fails at a crucial time or generates false signals, or the attacker can add a backdoor that can sniff out encryption keys, passwords or transmit internal ASIC chip data to the outside world.

Figure 1:
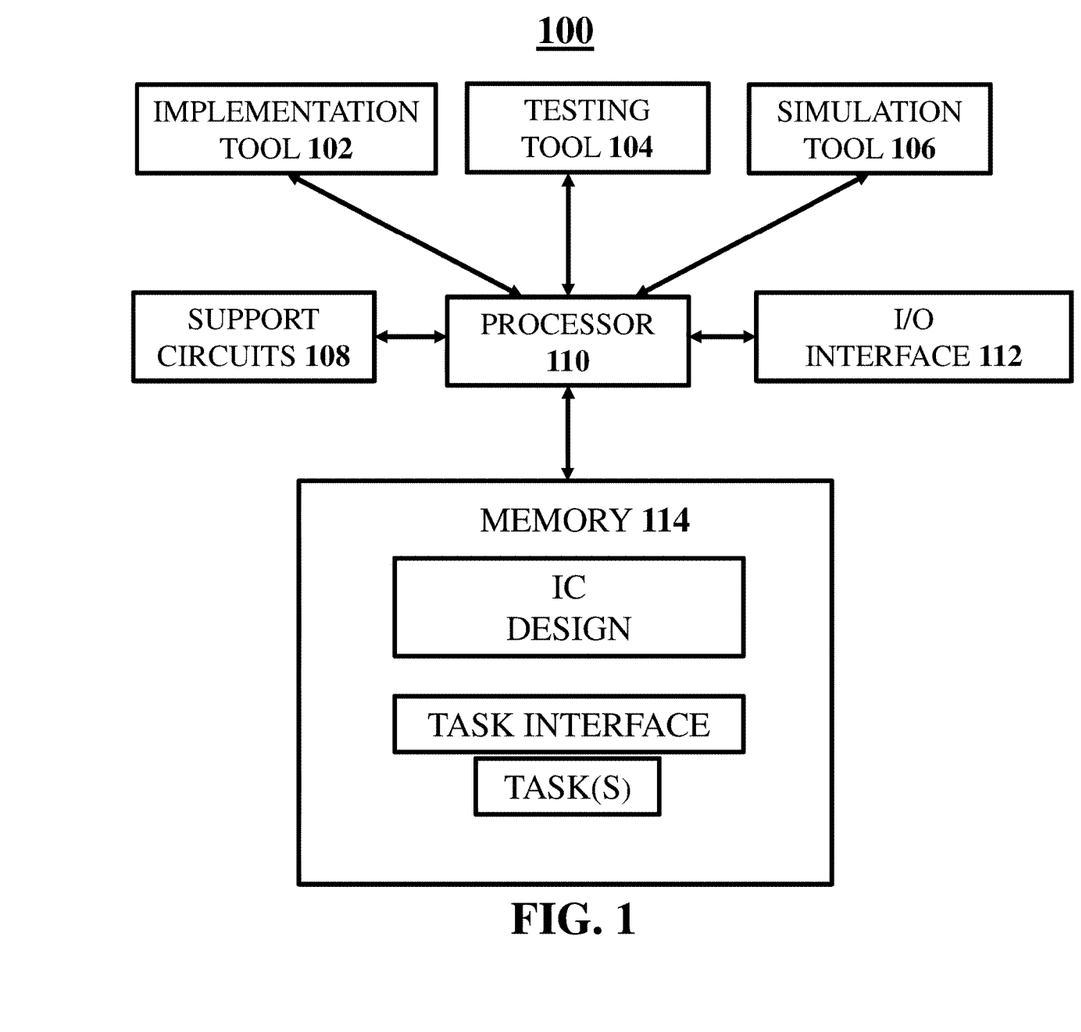
FIG. 1 illustrates a system for detecting malicious computer code in an integrated circuit in form of a hardware Trojan horse, according to an embodiment.

FIG. 1 illustrates a system 100 for detecting malicious circuits in an IC in form of an HTH. The system 100 may include an implementation tool 102, a testing tool 104, a simulation tool 106, various support circuits 108, a processor 110, I/O interface 112, and a memory 114. The implementation tool 102, the testing tool 104, the simulation tool 106, the various support circuits 108, the processor 110, the I/O interface 112, and the memory 114 communicate to each other through a network. The examples of the network may include, but are not limited to, private or public LAN, WLAN, MAN, WAN, and the Internet. The network may include both wired and wireless communications according to one or more standards and/or via one or more transport mediums. The communication over the network may be performed in accordance with various communication protocols such as Transmission Control Protocol and Internet Protocol (TCP/IP), User Datagram Protocol (UDP), and IEEE communication protocols. In one example, the network may include wireless communications according to Bluetooth specification sets, or another standard or proprietary wireless communication protocol. In another example, the network may also include communications over a cellular network, including, e.g., a GSM (Global System for Mobile Communications), CDMA (Code Division Multiple Access), EDGE (Enhanced Data for Global Evolution) network.

The system 100 described herein may operate in a cloud-computing environment where a processor 110 is cloudoptimized, and communicate data associated with one or more testing and other tasks with an implementation tool 102, a testing tool 104, and a simulation tool 106. All data and application programs may be stored and executed on a cloud-based memory 114 accessed over a network cloud. In the cloud computing environment, a web browser on a computer may interface with an application program and models that are executed on the cloud-based processor 110.

A processor 110 may execute various tools such as an implementation tool 102, a testing tool 104, and a simulation tool 106. The processor 110 may include suitable logic, circuitry, and interfaces that are operable to execute one or more instructions to perform predetermined operations/tasks. The processor 110 may be realized through a number of processor technologies. The examples of the processor 110 include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. In some embodiments, the processor 110 may include a Graphics Processing Unit (GPU) that executes a set of instructions to perform one or more processing operations.

Various support circuits 108 for a processor 110 may include conventional cache, power supplies, clock circuits, data registers, I/O interfaces, and the like. I/O interface 112 may be directly coupled to a memory 114 or coupled through a processor 110. The I/O interface 112 may also be configured for communication with an implementation tool 102, a testing tool 104, and a simulation tool 106 via a communication link.

An implementation tool 102 is configured to translate a hardware descriptive language (HDL) of an IC design to a gate level netlist of an IC design. In some embodiments, the implementation tool 102 may be used in conjunction of a compiler to translate an HDL of an IC design to a gate level netlist of an IC design. In some embodiments, a compiler associated with the implementation tool 102 may translate an HDL of an IC design to a gate level netlist of an IC design.

The implementation tool 102 may further insert a security circuitry and test capabilities into a functioning IC without modifying functionality of the IC. For this purpose, the implementation tool 102 may utilize a database of detection and mitigation techniques that are working properly for the insertion of the security circuitry within the IC. The implementation tool 102 may use design specifications of the IC, templates, analytical information, and to generate and implement recommendations for inserting the security circuitry onto the IC. In some embodiments, the implementation tool 102 may also execute DFT codes by inserting security circuitry into an IC that will allow for easy testing and analysis of the IC by transmitting correct signals and executing tests on the IC. The execution of the DFT codes may enable the IC to self-test in simulation or in a field. The DFT may be provided in a form of an RTL description or gate-level netlists. The implementation tool 102 may further be used in conjunction of the compiler to produce a physical description from the gate level netlist, and the physical description may include a bitstream. The term tool of the implementation tool 102 as used herein is meant to encompass software implementations, hardware implementations, or a combination of hardware and software implementations.

A testing tool 104 is capable of executing various tasks and processes for testing an IC or other logical processing circuitry, multiplexers configured to direct data signals to and from testing tool 104, buses for communicating data between the testing tool 104 and other devices, and data lanes connecting the components of the testing tool 104. In some embodiments, the testing tool 104 may provide for control of the test operations of the testing tool 104. In alternate embodiments, the testing tool 104 may be provided with a test controller or a test control module, which may provide for control of the test operations of the testing tool 104. The test control module may include software instructions that may be resident within a memory 114. The test control module may be configured to supervise test of distributed portions of the IC, and starting and stopping of the testing of the IC in a synchronized manner, coordinate time step testing, and monitor the state of ICs. The term tool of the testing tool 104 as used herein is meant to encompass software implementations, hardware implementations, or a combination of hardware and software implementations.

The testing tool 104 may use hardware description language (HDL) code with on-chip security circuitry for detecting and mitigating HTH in an IC. For instance, the testing tool 104 may be executed by a processor 110 to organize HDL code, such as Verilog or VHDL, into different regions of the IC, then measure their security risk to the IC as a whole, and offer recommendations for adding security circuitry to selected regions in the IC to make HTH insertion in the IC increasingly difficult, while not inundating the IC with extra security circuitry. Accordingly, the testing tool 104 is able to keep track of security measures in the IC, their costs, effectiveness, and IC design requirements.

The testing tool 104 may generate one or more recommendations for security circuitry insertion in an IC to improve the security of the IC. The testing tool 104 may generate the one or more recommendations based on design and functional requirements of the security circuitry and design requirements of IC developer for designing the IC. The testing tool 104 may process all available data such as the design and functional requirements of the security circuitry and design requirements of IC developer for designing the IC to select one or more tests and security circuitry to include in the IC for detecting and mitigating HTH in the IC. In some embodiments, the testing tool 104 may transmit all available data such as the design and functional requirements of the security circuitry and design requirements of IC developer for designing the IC to a processor 110, which may then select the one or more tests and the security circuitry to include in the IC for detecting and mitigating the HTH in the IC.

A processor 110 may receive from a testing tool 104 and other tools various types of data. In some embodiments, the processor 110 may receive data from a simulation tool 104, such as results from many simulations through a design process of an IC, which may be used by the processor 110 to identify potential zones for insertion of security circuitry in the IC. Upon identifying the potential zones for insertion of the security circuitry in the IC for detecting and mitigating HTH in the IC, the processor 110 may then insert the security circuitry in said potential zones. In some embodiments, the processor 110 may consider a size, cost, and power consumption of the IC when adding the security circuitry to the potential zones in the design of the IC. The processor 110 may add the security circuitry to a portion/zone of the design of the IC such that the processor 110 may control different interfaces and different modules of the IC along with any communication of data between different regions of the IC to effectively lock down the IC without adding the security circuitry to every portion/zone of the IC. A balance between cost-effectiveness and security of the IC improves as the processor 110 collects more data through the simulation and the optimization phases of the IC.

The testing tool 104 may leverage a multitude of tests based on capabilities and efficiency of the testing tool 104. In one example, the execution of a security circuitry test in the IC may include adding a path delay analysis and a measurement of timing delay through combinatorial circuitry of the IC. If there is any HTH inserted within the IC, the execution of said security circuitry test may enable the HTH to make its presence known to the testing tool 104. Such security circuitry test is effective in finding the HTH, and also increases size and power requirement needs of the IC. Prior to the execution of the security circuitry test, the testing tool 104 may also determine if a more thorough full path delay analysis is required in the IC, or if a more efficient approach of selective path delay analysis is required in the IC.

The testing tool 104 may further generate and/or execute one or more mitigation techniques for shielding an IC against a triggered HTH in the IC, or to prevent the HTH from ever triggering within the IC. One mitigation technique may include power resets, which may stop time bomb triggers in the IC from going off. Another mitigation technique may include data obfuscation, which encrypts and/or decrypts data entering and exiting trusted zones in the IC using pseudo unclonable functions (PUFs) to keep "cheat code" triggers from activating within the IC. The PUFs may enable the IC to have a random number generation advantageous for generating tests patterns and encrypting data in the IC. Yet another mitigation technique may include reorganization of logic inside the IC that is not sensitive to order within the IC, which may break the HTH trigger before the HTH trigger occur by changing a data logic the HTH trigger may depend on in the IC.

Each of one or more mitigation techniques may have particular design requirements and tradeoffs when it comes to cost and effectiveness. A testing tool 104 may select a mitigation technique among the all of the mitigation techniques based on gathered analytics and design requirements of security circuitry and an IC being altered. In some embodiments, the testing tool 104 may select the mitigation technique among the all of the mitigation techniques based off if a region in the IC requires persistent security in a form of delay analysis, or if the region in the IC is critical enough, such as power controls, that said region requires extra protection in a form of data obfuscation. In some embodiments, the testing tool 104 may use design requirements, the HDL code, and the statistical analysis to either select a mitigation technique among the all of the mitigation techniques or automate the process of the selection of the mitigation technique among the all of the mitigation techniques.

In some embodiments, the testing tool 104 may identify trusted and untrusted modules in a design of an IC that may require additional security. In order for the testing tool 104 to identify the trusted and untrusted modules in the design of the IC that may require additional security such as security circuitry, the testing tool 104 may identify critical regions/portions/zones of the IC, which may correspond to one or more modules associated with cryptography or communications, and target the one or more modules for the additional security such as the security circuitry. The testing tool 104 may also target unverified IC for additional security such as the security circuitry, as well as any HDL code that hasn't been verified. The testing tool 104 described herein has several features and advantages. For instance, the testing tool 104 is configured to operate with HDL languages such as Verilog or VHDL in a visual and manageable way. In order for the testing tool 104 to be able to operate with the HDL languages such as the Verilog or the VHDL in a visual and manageable way, the testing tool 104 may provide circuit designers with a clean and visual representation of the HDL code that separates the HDL code into various zones/portions/regions based on interfaces, inputs and outputs to sections of the IC and the resources present within the IC. The testing tool 104 may further provide security solutions to enable finer grain controls over the security of the IC without sacrificing cost efficiency. For example, the testing tool 104 may provide a circuit designer complete control over security solutions in the IC by not simply targeting the whole IC chip, but by targeting untrusted/high risk modules within the IC, and the exit and entrance into the untrusted/high risk modules and trusted zones. The testing tool 104 may also strictly control interfaces, and the primary source of HTH trigger in the IC. The testing tool 104 may further provide analytics to end users (such as ASIC developer) by analyzing data acquired through simulation and optimization phase of production of the IC, and for this purpose, the testing tool 104 may read in data from simulations and benchmarks to ensure that the security circuitry added in the IC doesn't compromise the IC chip functionality. Lastly, the testing tool 104 may expand analytics to enhance power efficiency of added security measures such as the security circuitry in the IC, and for this purpose, the testing tool 104 may optimize protected ICs to reduce power consumption by reducing redundancy and improving existing security solutions corresponding to the IC.

A simulation tool 104 is configured to compile and execute a test bench. The test bench is configured to execute one or more verification processes on IC design, which may include security circuitry, for functionally verifying overall IC design including security circuitry. The IC design and the test bench may be specified using a hardware modeling language, such as HDLs or higher-level languages, such as SystemC, System Verilog, and the like, or programming languages, such as C, C++, and the like. In some cases, the IC design may include behavioral portions that are not directly synthesizable. The behavioral portions of the IC design may be modeled in software, for example, compiled and executed via the simulation tool. Likewise, the test bench may include synthesizable portions capable of being modeled in hardware. The term tool of the simulation tool 104 as used herein is meant to encompass software implementations, hardware implementations, or a combination of hardware and software implementations.

The simulation tool 104 may further include a task stub, one or more run-time controllers, and a channel memory. The one or more run-time controllers or the task stub may be separate elements in the simulation tool 104. The channel memory may be implemented in a memory 114. For example, the channel memory may be an address space in the memory 114 maintained by the simulation tool 104. The run-time controller is configured to provide an input signal to a task server, and receive an output signal from the task server. In the simulation tool 104, the task stub is configured to manage remote procedure calls for communicating with the task server. The task stub is defined to be an automatic and time consuming process. The simulation tool 104 may manage threading for the task stub.

The simulation tool 104 may be a programmable device used in verification of IC design. The simulation tool 104 may test and verify the operation of the IC and the security circuitry, an entire board of ICs, or an entire system without having to first physically fabricate hardware. The simulation tool 104 may include a computer for providing simulation support facilities, such as simulation software, a compiler, and a graphical user interface to allow a person to program the simulation tool 104.

A compiler may be a software module, which may be executed by a processor 110, and is configured to receive and compile a netlist design file containing a logical gate design of an IC and a security circuitry, and then to generate a virtual logic file based on the compiled netlist. The compiler maps the IC's logic and timing of operations into hardware components of a system 100 to generate instructions for the components of the system 100 to cause the system 100 to function as the IC would function. The compiler module may include a partitioner and scheduler component or function, though it should be appreciated that the compiler may be segmented into any number of component software modules. In an opening import phase, the compiler receives the netlist and begins compiling. Here, the compiler may parse the logic gates of the netlist into a database format. A partitioner may determine which part of the netlist is going to be executed by which type of hardware resource of the system 100. Then, a scheduler may determine for that part of the netlist which of the hardware resources should execute the part of the netlist and when in the execution lifecycle the netlist should be executed. The compiler may be capable of determining the status of components of the system 100, including the allocation status or whether the netlist is broken (i.e., marked-out).

A simulation software may be a software module, which may be executed by a processor 110, and is configured to track the status and control the performed of components of a system 100. The simulation software may determine which components of the system 100 are available or unavailable to receive parts of virtual logic generated by the compiler. In some embodiments, the simulation software continuously polls or self-tests the system 100 for faulty hardware components and presence of HTH. In some embodiments, the simulation software may determine the status of components of the system 100 when the virtual logic is being loaded into the hardware components of the system 100. In some embodiments, the simulation software may determine whether the instructions of the virtual logic should be revised from the instructions that were originally compiled. The simulation software may be configured to automatically make this determined, or may receive instructions from an administrator through a GUI to review and revise the complied instructions. In some embodiments, these software modules may be executed in whole or in part on the processor 110, which may communicate data and instructions associated with the respective software module to and from the processor 110.

A memory 114 may store a set of instructions, IC design, tasks, and other data. Some of the memory 114 implementations include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Further, the memory 114 includes the one or more instructions that are executable by a processor 110 to perform specific operations. It is apparent to a person having ordinary skills in the art that the one or more instructions stored in the memory 114 enable the hardware of the system 100 to perform the predetermined operations/tasks.

The memory 114 may further store records of virtual logic or instruction sets compiled by a compiler from netlist files. The memory 114 may be hosted in non-transitory machine-readable storage medium of any computing device capable of hosting the memory 114 and performing the various tasks and processes associated with the memory 114, as described herein. The memory 114 may receive, from a device executing a compiler, instructions compiled from the netlist file of an IC. In some cases, the instructions may be within a virtual logic file generated by the compiler. At download time, when the hardware components of the system 100 are loaded with the instructions, the memory 114 may transmit or provide the instructions to the components, and the instruction sets are loaded into the memories of the respective hardware components within the logic boards. The memory 114 may further contain records for components of the system 100. The records may indicate various types of status information about components, such as allocation status, availability status (e.g., busy, broken, incompatible), execution status (e.g., busy, idle), and the like. The memory 114 may be periodically updated by modules and tools of the system 100.

The memory 114 may be a non-volatile storage device for storing threat information and/or corresponding alerts data and instructions, to be used by devices of a system 100. The memory may be implemented with a magnetic disk drive, an optical disk drive, a solid-state device, or an attachment to network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

The memory 114 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Figure 2:
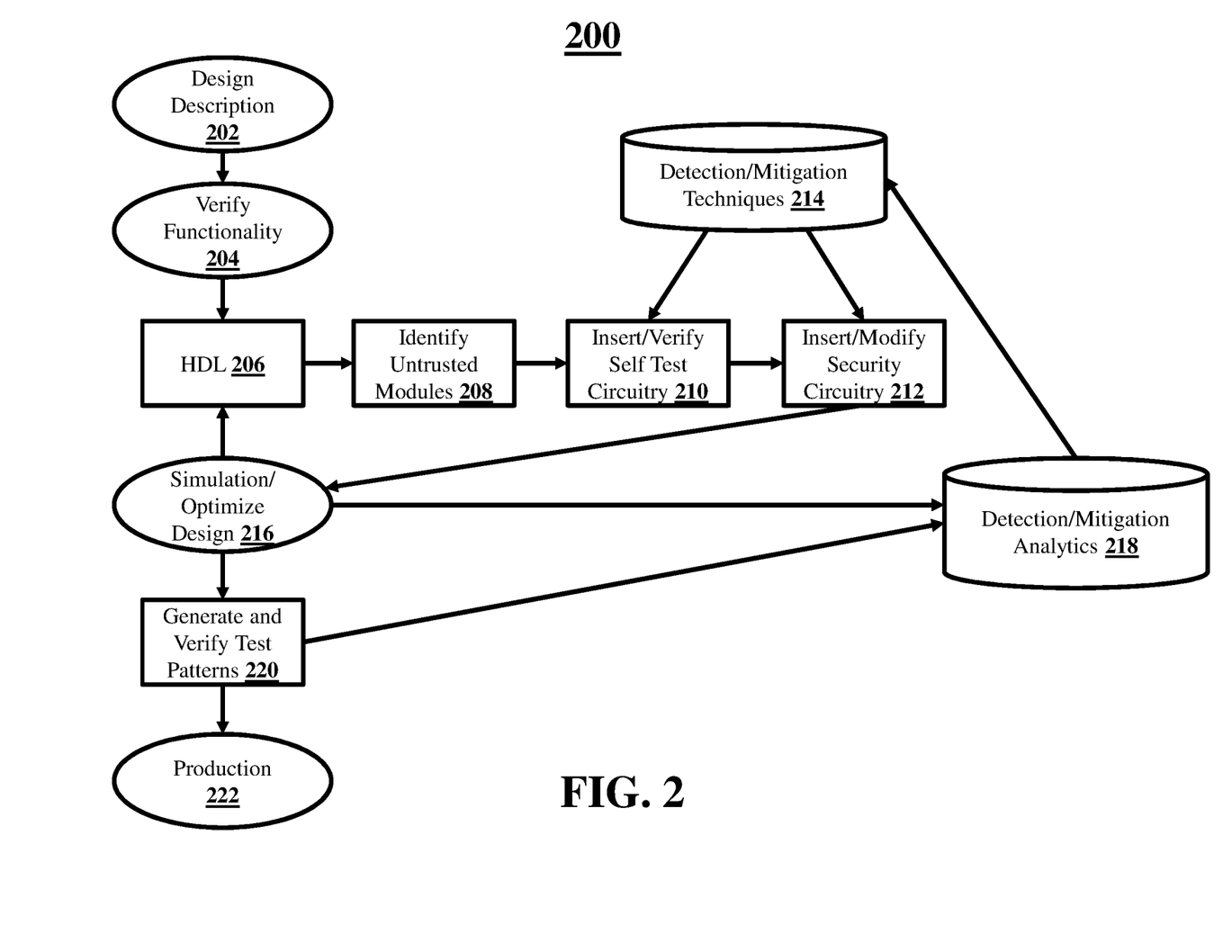
FIG. 2 illustrates a block diagram showing various steps for detecting malicious computer code in an integrated circuit in form of a hardware Trojan horse, according to an embodiment.

FIG. 2 illustrates a block diagram showing various steps for detecting malicious circuits in an IC in form of a hardware Trojan horse. The design process of the IC may involve several steps of simulation and optimization, and an implementation tool, a testing tool, and a simulation tool may fit into design workflow of the IC. Initially, a design tool may generate design description 202 of the IC. The design description 202 may include a collection of cells that represents the IC of an electronic device that performs a certain function. A net represents the connection on which electrical signals travel between the cells. A netlist consists of the cells and the nets. The netlist is a representation of the electronic circuit used to perform optimizations. The netlist name can also be referred to as the design name. The design description 202 may further include pins of each of the cells and the pin names as well the functional relationship, i.e., the output pin values as a function of the signal values at the input pins between the pins, e.g., specified as a method to compute the signal values at the output pins given the signal values at the input pins. The design description 202 may further include physical information for the cells such as delay information, area or floor plan information. Each cell in the design description 202 of the IC design corresponds to one specific library cell. A cell library may be a collection of library cells.

A verification tool or some other tool may then verify functionality 204 of the IC. The verification tool or some other tool may include multiple verification modules, with each verification module evaluating one of more combinatorial logic blocks of the IC. During the verification process, the verification tool or some other tool may generate an output data corresponding to each state change in the target IC design. A state change may be caused either due to the logic implemented within the target IC design or due to changes in the input data. The computation of the outputs of each change of state of the target IC design is referred to as a verification cycle. The verification cycle consists of a specified number of machine cycles, dependent on the target IC design and its mapping into the various modules. The stage of the combinatorial logic may be evaluated in each machine cycle.

Upon successful verification of the IC, a testing tool or some other tool may then further process a verified IC design, and import HDL code 206 of the IC design, such as Verilog or VHDL. The HDL code may be tested prior to manufacture of the IC. The code and design verification of the IC may then be performed to ensure that IC design's implementation satisfies the requirements of its specification. For instance, the HLD functional verification may be used to verify that the parts of the IC, which are described using the HDL match their functional specification. The functional verification may then be achieved through functional simulation or formal verification of the IC.

The testing tool or some other tool may then start identifying one or more trusted modules and one or more untrusted modules 208 in the HDL code 206. In some embodiments, the testing tool or some other tool may automatically identify the one or more trusted nodules and the one or more untrusted modules 208 in the HDL code 206 based on processing of all available data of previous operations of the testing tool. Once trusted and untrusted modules 208 have been identified, then the testing tool or some other tool may generate one or more recommendations to develop a security solution corresponding to the untrusted modules 208 that balances cost effectiveness and security of the IC. The security solution may include a security circuitry, which may be embedded within the IC. The testing tool or some other tool may then insert security solution 212 such as the security circuitry 210 into the IC design.

A simulation tool or some other tool may further run simulations 216 of an IC design, and test results of simulation 220 may then be used for evaluation and optimization of the IC design. The simulation tool or some other tool may continue to use information corresponding to the results of the simulation 220 to optimize security on current and future IC designs. In some embodiments, the simulation tool may process and perform analytics 218 on the results of the simulation 220 to identify and/or generate new detection and mitigation techniques 214, which may be used to detect HTH and mitigate HTH trigger events. In some embodiments, a testing tool may process and perform analytics 218 on the results of the simulation generated by the simulation tool to identify and/or generate the new detection and mitigation techniques 214, which may be used to detect HTH and mitigate HTH trigger events. The testing tool may be modular in that the testing tool may facilitate adding of the new detection and mitigation techniques 214 as the new detection and mitigation techniques 214 become available, but at a same time improved testing tool fits into a current design flow of Electronic Design Automation (EDA).

Once results of simulation 220 are verified, then an IC (having a security circuitry 210) is produced and/or fabricated 222. After the IC has been manufactured, the IC may then have on board tests that may be run to detect HTH or probable HTH triggering events at any time before and after development of the IC. The produced and/or fabricated IC 222 may also have additional built-in security mechanisms to break, mitigate, or prevent the HTH from triggering within the IC. In some embodiments, even when the HTH is inserted into the IC after development of the IC, or the HTH is triggered during scanning of the IC, the security circuitry 210 and additional built-in security mechanisms inserted at any location within the IC will offer IC chip wide security. In other words, the security circuitry 212 and the additional built-in security mechanisms provide a full suite of protection of the IC, while utilizing analytics to help guide an IC developer in a most secure and efficient way possible.

Figure 3:
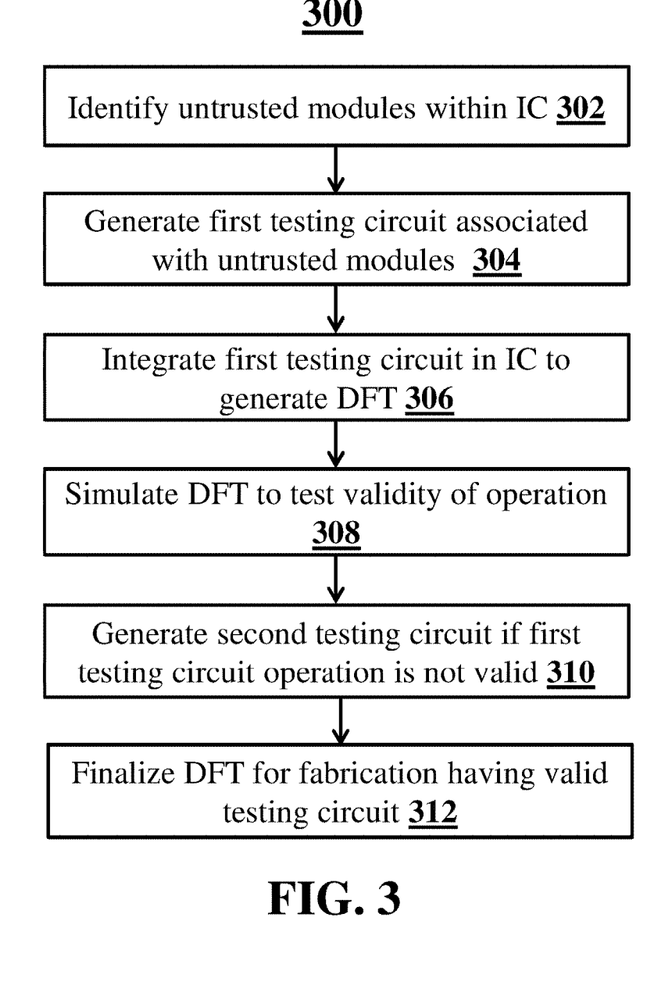
FIG. 3 illustrates a method for detecting malicious computer code in an integrated circuit in form of a hardware Trojan horse, according to an embodiment.

FIG. 3 shows execution of a method to detect malicious computer code in an (IC in form of an HTH, according to a method 300. The method 300 shown in FIG. 3 comprises execution steps 302, 304, 306, 308, 310, and 312. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of the FIG. 3 is described as being executed by a computer in this embodiment. However, one having skill in the art will appreciate that, in some embodiments, steps may be executed by any number of computers operating in a distributed computing environment. In some cases, a computer executing one or more steps may be programmed to execute various other, unrelated features, where such computer does not need to be operating strictly as the computer described herein.

In a first step 302, the computer may execute an editing tool. The editing tool may aid in analysis and modification of an HDL code representing an IC design. In some embodiments, the IC design may be represented by higher-level languages, such as SystemC, System Verilog, and the like, or programming languages, such as C, C++, and the like. The editing tool may be an editor, which may provide a visual representation of the HDL code, and further provide analytics and security recommendations to detect and mitigate HTH. The term tool of the editing tool as used herein is meant to encompass software implementations, hardware implementations, or a combination of hardware and software implementations.

The computer may then execute one or more processes to break HDL code (such as VHDL code) into one or more modules/portions/zones/regions, which may be classified as trusted and untrusted/critical nodules. The trusted and untrusted modules may be classified based on functions performed by each module, one or more interfaces of each module, and resources managed by each module. Each trusted and untrusted module has a number of interfaces, which may be identified in the HDL code and may be used to classify into one or more categories such as control, data, test, and output. The interfaces to each trusted and untrusted module define functionality of each trusted and untrusted module, and are primary source of triggers for HTHs, which will aid in breakdown of the VHDL code, as well as trust identification and insertion of security solutions in the IC in the subsequent steps.

In some embodiments, a computer may define one or more categories on an IC based on one or more interfaces present in the IC, resources controlled, and common HTH practices. The one or more categories on the IC may then be classified into trusted and untrusted modules. In one example, a control interface into a region/module of the IC controlling power input may be marked as untrusted module, as this resource region of the IC has a capability to destroy the entire IC. In another example, a data interface into a region/module of the IC controlling external communications of the IC may be marked as untrusted module as this resource region of the IC control what data is being exfiltrated and to where the data is being exfiltrated.

In a next step 304, the computer may generate a design of a first testing circuit associated with the untrusted modules. The first testing circuit may correspond to security circuitry, which may be designed based on configuration of the IC, configuration of the untrusted module, and features associated with HTH to detect and mitigate HTH in the IC.

In some embodiments, the computer may query a database, which may include information associated with security circuitry for detection and mitigation of the HTH using information associated with the configuration of the IC and the configuration of the untrusted module to determine and/or generate the design of the first testing circuit. The information associated with security circuitry for detection and mitigation of the HTH in the database may be updated as new detection and mitigation techniques become available or as old detection and mitigation techniques become less effective.

In some embodiments, the computer may analyze each of the interfaces and modules of the IC to determine the design of the first testing circuit. For instance, the computer may determine that two trusted modules of the IC are passing data between themselves through a first untrusted module of the IC. This may imply that the first untrusted module may be used only for passing data through, however a second untrusted module may be making computations associated with the data. The first untrusted module may then execute passthrough encryption program on data on the way in to the first untrusted module and decrypt the data on the way out from the first untrusted module, while the second untrusted module may require homomorphic encryption as to not alter the output of the first untrusted module. An illustrative passthrough encryption program is shown below.

```
module untrusted_module_wrapper(clk, data, control,
    random, out);
    input clk, data, control, random;
    wire untrusted_out;
    output out;
    BLACK_BOX untrusted(.clk(clk),
        .data (data xor random),
        .control (control),
        .out (untrusted_out));
    assign out=untrusted_out xor random;
end module
```

The computer may use these interfaces and wire designations to read the VHDL code, and recognize the differences to generate and recommend the first testing circuit to implement in the IC in order to manage the first and the second untrusted modules.

Figure 4:
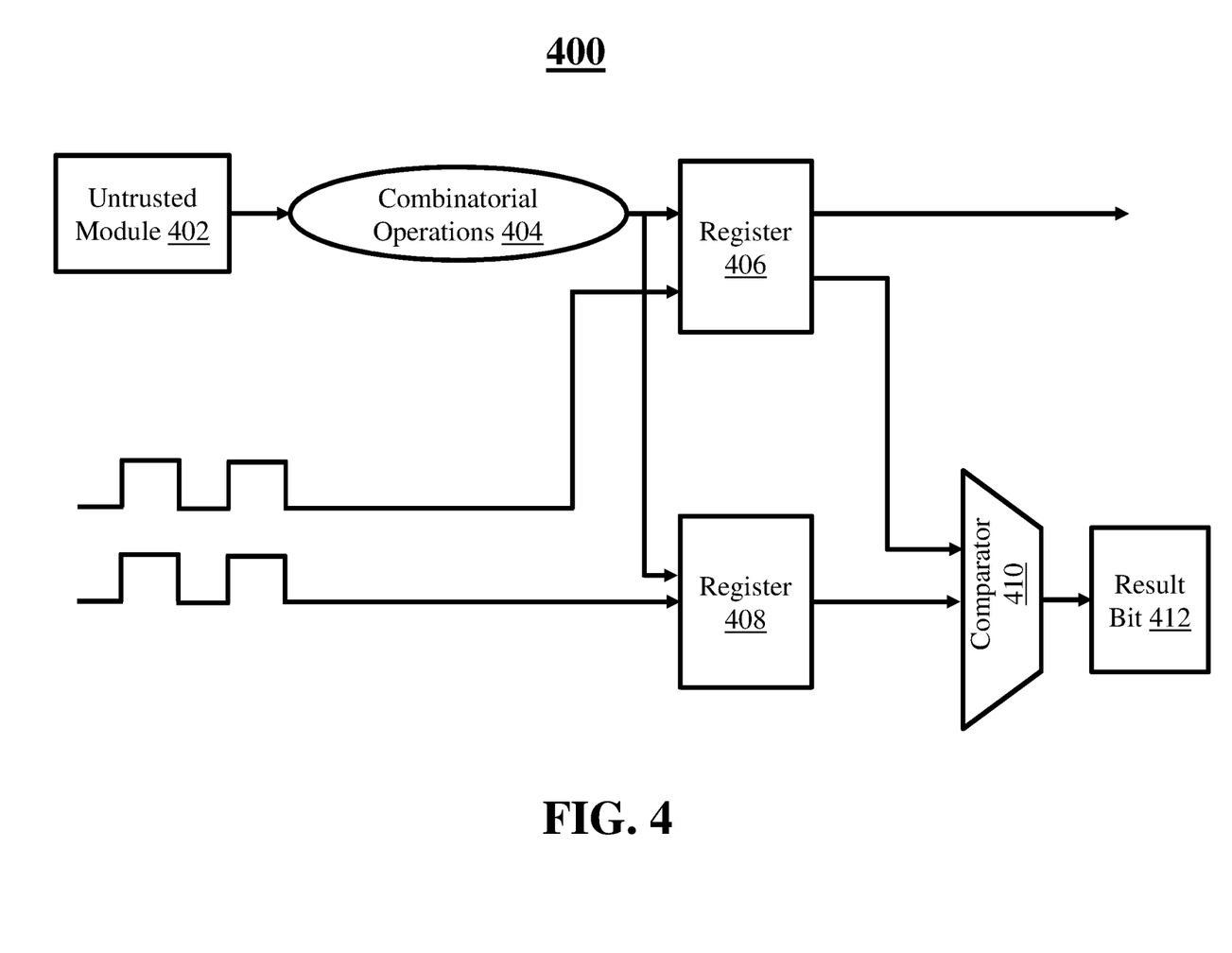
FIG. 4 illustrates a testing apparatus for a path delay analysis, according to an embodiment.

In some embodiments, the computer may identify an untrusted module from all modules of the IC, which may be controlling power output on the IC. The computer may then generate a design of a testing apparatus 400, which may perform a path delay analysis to check for changes indicating an HTH, as seen in FIG. 4. The computer may then generate parameters for integrating the testing apparatus 400 into the IC. For instance, the computer may determine a code corresponding to the testing apparatus 400 for path delay analysis in the IC, inputs and outputs, and all interfaces.

In a next step 306, the computer may integrate a design of the IC with a design of the first testing circuit to generate a DFT of the IC. In some embodiments, the computer may use IC design requirements and boiler plate VHDL code, along with placeholders to determine where the first testing circuit should be integrated into the IC to generate the DFT.

In a next step 308, the computer may simulate the DFT to test and verify the validity of operation of the IC, the first testing circuit, an entire board of ICs, or an entire system without having to first physically fabricate hardware. In some embodiments, the simulation of the DFT may run along-side the original IC design, and the computer may compare results of the simulation to ensure the functionality of the IC chip was not compromised by added security measures such as the first testing circuit.

In a next step 310, the computer may generate a design of a second testing circuit associated with the untrusted modules in response to the computer determining that the operation of the first testing circuit is invalid. The second testing circuit may correspond to security circuitry, which may be designed based on details for failure of the first testing circuit, configuration of the IC, configuration of the untrusted module, and features associated with HTH to detect and mitigate the HTH.

In some embodiments, the computer may query a database, which may include information associated with security circuitry for detection and mitigation of the HTH using information associated with the configuration of the IC and the configuration of the untrusted module to determine and/or generate the design of the second testing circuit. The information associated with security circuitry for detection and mitigation of the HTH in the database may be updated as new detection and mitigation techniques become available or as old detection and mitigation techniques become less effective.

The computer is then configured to integrate a design of the IC with a design of the second testing circuit to generate a design-for-test (DFT) of the IC. In some embodiments, the computer may use IC design requirements and boiler plate VHDL code, along with placeholders to determine where the second testing circuit should be integrated into the IC to generate the DFT.

In a next step 312, the computer may indicate that the DFT is finalized for fabrication in response to the computer determining that the operation of the first testing circuit is valid. The DFT may include the first testing circuit. In some embodiments, the computer is configured to indicate that the DFT is finalized for fabrication in response to the computer determining that the operation of the second testing circuit is valid. The DFT may include the second testing circuit.

FIG. 4 illustrates a testing apparatus 400, which may perform a path delay analysis to check for changes indicating a HTH in an IC. The testing apparatus 400 may include the IC having an untrusted module 402 on which various combinatorial operations 404 may be performed. The testing apparatus 400 may further include a testing circuit having registers 404 and 407 and a comparator 410, whose execution may result in output 412 in form of bits. During operation, a computer may first analyze each of the interfaces and modules of the IC to determine a design of the testing circuit. For instance, the computer may determine that two trusted modules of the IC are passing data between themselves through the untrusted module 402 of the IC. The computer may identify the untrusted module 402 from all modules of the IC, which may be controlling power output on the IC. The computer may then generate the testing circuit having the registers 404 and 407 and the comparator 410, which may perform a path delay analysis to monitor changes indicating the presence of the HTH in the IC.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
identifying, by a computer, one or more untrusted modules within an integrated circuit (IC) design of an IC based upon functions performed by each of the one or more untrusted modules;
generating, by the computer, a first testing design of a first testing circuit;
inserting, by the computer, one or more security circuitry into at least one of the one or more untrusted modules separate from the IC design as compiled;
integrating, by the computer, the first testing design of the first testing circuit and the security circuitry within the IC design of the IC to generate a design-for-test (DFT);
simulating, by the computer, the DFT to test a validity of operation of the first testing circuit as integrated with the IC design of the IC;
in response to the computer determining that the operation of the first testing circuit is invalid as integrated with the IC design of the IC, generating, by the computer, a second testing design of a second testing circuit associated with the untrusted modules and separate from the IC design as compiled and separate from the first testing design as generated, wherein the second testing design of the second testing circuit corresponds to the security circuitry and based on configuration of the untrusted module; and in response to the computer determining that the operation of the first testing circuit is valid as integrated with the IC design of the IC, indicating, by the computer, that the DFT is finalized for fabrication.

2. The method according to claim 1, further comprising classifying, by the computer, one or more regions of the IC into the one or more untrusted modules based on functions performed by each of the one or more untrusted modules.

3. The method according to claim 1, further comprising classifying, by the computer, one or more regions of the IC into the one or more untrusted modules based on one or more interfaces associated with each of the one or more untrusted modules.

4. The method according to claim 1, further comprising classifying, by the computer, one or more regions of the IC into the one or more untrusted modules based on resources managed by each of the one or more untrusted modules.

5. The method according to claim 1, wherein components and configuration of the second testing circuit is different from components and configuration of the first testing circuit.

6. The method according to claim 1, wherein the first testing circuit corresponds to an on-chip security circuitry for detecting and mitigating Hardware Trojan Horses (HTHs) in the IC.

7. The method according to claim 5, wherein the second testing circuit corresponds to an on-chip security circuitry for detecting and mitigating Hardware Trojan Horses (HTHs) in the IC.

8. The method according to claim 1, further comprising executing, by the computer, an editing tool to analyze and modify a hardware description language (HDL) code representing the IC.

9. The method according to claim 1, further comprising updating, by the computer, information associated with the first testing circuit in a database based on one or more Hardware Trojan Horse (HTH) detection and mitigation techniques.

10. The method according to claim 1, further comprising updating, by the computer, information associated with the second testing circuit in a database based on one or more Hardware Trojan Horse (HTH) detection and mitigation techniques.

11. A system comprising:
a non-transitory storage medium hosting a repository storing an integrated circuit (IC) design of the IC;
a hardware processor coupled to the non-transitory storage medium and configured to:
identify one or more untrusted modules within the IC design of the IC based upon functions performed by each of the one or more untrusted modules;
generate a first testing design of a first testing circuit;
inserting, by the computer, one or more security circuitry into at least one of the one or more untrusted modules separate from the IC design as compiled;
integrate the first testing design of the first testing circuit and the security circuitry within the IC design of the IC to generate a design-for-test (DFT);
simulate the DFT to test a validity of operation of the first testing circuit as integrated with the IC design of the IC;
in response to the processor determining that the operation of the first testing circuit is invalid as integrated with the IC design of the IC, generate a second design of a second testing circuit associated with the untrusted modules and separate from the IC design as compiled and the first testing design as generated, wherein the second testing design of the second testing circuit corresponds to the security circuitry and based on configuration of the untrusted module; and
in response to the processor determining that the operation of the first testing circuit is valid as integrated with the IC design of the IC, indicate that the DFT is finalized for fabrication.

12. The system according to claim 11, wherein the processor is configured to classify one or more regions of the IC into the one or more untrusted modules based on functions performed by each of the one or more untrusted modules.

13. The system according to claim 11, wherein the processor is configured to classify one or more regions of the IC into the one or more untrusted modules based on one or more interfaces associated with each of the one or more untrusted modules.

14. The system according to claim 11, wherein the processor is configured to classify one or more regions of the IC into the one or more untrusted modules based on resources managed by each of the one or more untrusted modules.

15. The system according to claim 11, wherein components and configuration of the second testing circuit is different from components and configuration of the first testing circuit.

16. The system according to claim 11, wherein the first testing circuit correspond to an on-chip security circuitry for detecting and mitigating Hardware Trojan Horses (HTHs) in the IC.

17. The system according to claim 15, wherein the second testing circuit correspond to an on-chip security circuitry for detecting and mitigating Hardware Trojan Horses (HTHs) in the IC.

18. The system according to claim 11, wherein the processor is configured to execute an editing tool to analyze and modify a hardware description language (HDL) code representing the IC.

19. The system according to claim 11, wherein the processor is configured to update information associated with the first testing circuit in a database based on one or more Hardware Trojan Horse (HTH) detection and mitigation techniques.

20. The system according to claim 11, wherein the processor is configured to update information associated with the second testing circuit in a database based on one or more Hardware Trojan Horse (HTH) detection and mitigation techniques.

* * * * *